(12) United States Patent
Yue

(10) Patent No.: US 7,050,485 B2
(45) Date of Patent: May 23, 2006

(54) ITERATIVE CDMA PHASE AND FREQUENCY ACQUISITION

(75) Inventor: Lin Yue, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 766 days.

(21) Appl. No.: 10/140,319

(22) Filed: May 7, 2002

(65) Prior Publication Data

US 2003/0210736 A1    Nov. 13, 2003

(51) Int. Cl.
*H04B 1/69* (2006.01)
(52) U.S. Cl. ................................ 375/149; 375/150
(58) Field of Classification Search ................ 375/130, 375/140, 145, 147, 149, 150, 343, 344, 345
See application file for complete search history.

(56) References Cited

U.S. PATENT DOCUMENTS

| 5,812,593 | A | * | 9/1998 | Kaku ........................ 375/150 |
| 5,999,561 | A | * | 12/1999 | Naden et al. ............... 375/142 |
| 6,134,260 | A |   | 10/2000 | Bottomley et al. |
| 6,178,197 | B1 | * | 1/2001 | Froelich et al. ............ 375/150 |
| 6,385,232 | B1 | * | 5/2002 | Terashima .................. 375/149 |
| 6,421,369 | B1 | * | 7/2002 | Iwaskai et al. ............. 375/130 |

FOREIGN PATENT DOCUMENTS

| EP | 0 892 528 | 1/1999 |
| WO | WO 01 76087 | 10/2001 |
| WO | WO 02 29994 | 4/2002 |

* cited by examiner

*Primary Examiner*—Tesfaldet Bocure
*Assistant Examiner*—Naheed Ejaz
(74) *Attorney, Agent, or Firm*—Michael J. Ure

(57) ABSTRACT

A system and method is provided that searches for the frequency and phase of a CDMA transmission in an iterative manner. With its automatic frequency control (AFC) disabled, the receiving system performs a coarse search for the transmitter's CDMA phase at a nominal receiving frequency. When the coarse phase is obtained, the AFC is invoked with a large-range pull-in, to obtain an initial, coarse frequency that is likely to be closer to the transmitter's frequency than the initial nominal frequency. At this coarse frequency, the receiving system repeats its search for the transmitter's CDMA phase, starting at the previously determined coarse phase. Because this second phase determination is conducted in the presence of less frequency error, it provides for a more accurate phase determination. The AFC is again invoked, but with a small-range pull-in, to obtain a finer frequency determination. Because the finer frequency determination is conducted in the presence of less phase error, a substantial improvement in the accuracy and precision of the frequency determination can be achieved. To achieve this more accurate phase and frequency determination within the same time duration as a conventional acquisition process, the initial coarse phase determination is conducted using a rapid, albeit less accurate, process than the conventional phase determination.

15 Claims, 1 Drawing Sheet

ITERATIVE CDMA PHASE AND FREQUENCY ACQUISITION

BACKGROUND OF THE INVENTION

1. Field of the Invention

This invention relates to the field of communications, and in particular to a system and method for the initial acquisition/determination of the phase and frequency of a pilot CDMA signal.

2. Description of Related Art

CDMA (Code-Division Multiple Access) systems are common in the art, particularly in the field of mobile communications. Multiple communication channels are provided within the same frequency band by 'spreading' the information content of each channel across the frequency band by modulating the information using a specific code pattern. The code pattern is designed such that the modulated signal appears as noise to any demodulator that is not in phase with the modulated signal. That is, a demodulator that applies the same code pattern to the modulated signal coincident with the application of the code pattern to the information signal will produce a reproduction of the information signal. On the other hand, a demodulator that applies either a different code pattern, or the same code pattern at a different phase, than the modulation system, will produce an incoherent signal. The different code patterns that provide this desired coherent/incoherent effect are referred to as "orthogonal" codes. Of particular note, each of the incoherent signals will exhibit the same characteristics as random noise, and common noise-filtering techniques can be employed to minimize their adverse effects.

In a multiple communication CDMA system, therefore, when a demodulator is 'tuned' to, or 'in-phase' with, a particular CMDA transmitter, the demodulated signal will appear as a coherent signal within a bed of noise that is produced by all of the other 'out-of-phase' CDMA transmitters.

For a demodulator to be in-phase with a transmitted signal, the start of the demodulating code must occur within the transmitted stream at the same point that the modulating code was applied to the information signal. To remain in-phase, the demodulating code must be applied to the transmitted stream at the same frequency that the modulating code was applied to the information signal. Thus, proper tracking of a transmitted signal requires a determination of both the frequency and the phase of the transmission. This determination of frequency and phase of a transmission is defined as the acquisition of the transmission.

To facilitate acquisition when communication is initiated between a transmitter and receiver, the transmitter transmits a pilot-signal that includes a CDMA modulation at a particular phase. The receiver applies the CDMA code to the received transmission at progressively different phases until a coherent signal is detected. When the coherent signal is detected, the receiver locks onto the transmission frequency, using conventional AFC (Automatic Frequency Control) techniques. To detect the coherent signal, the receiver must be operated at approximately the same frequency as the transmitter. Otherwise, even if the demodulation code starts at the same point in the stream that the modulation code started (i.e. is in-phase with the modulation code at the start of the code sequence), a substantial difference between the transmitter and receiver frequency will cause the demodulation code to be out of phase with the modulation code before the end of the code sequence.

In a conventional CDMA system, the receiver is operated at a variety of frequencies about the nominal transmission frequency, and at each frequency, the aforementioned phase-variation-until-coherency process is performed until a coherent signal is detected. When a coherent signal is detected, indicating that the receiver is operating at the frequency and phase of the transmitter, the receiver ceases both the frequency and phase searching, and activates an AFC process to maintain frequency-lock with the transmitter.

Once the transmission signal is acquired, the receiver terminates the search-mode and enters a steady-state mode for providing communications between the transmitter and the receiver, using the acquired frequency and phase to effect proper demodulation. U.S. Pat. No. 6,134,260 "METHOD AND APPARATUS FOR FREQUENCY ACQUISITION AND TRACKING FOR DS-SS CDMA RECEIVERS", issued 17 Oct. 2000 to Bottomley et al, discloses techniques for maintaining frequency and phase tracking after the initial frequency and phase are determined, and is incorporated by reference herein as typifying a conventional prior-art CDMA system.

Because the frequency and phase information is assumed to be correct when the receiver enters the steady-state mode, and the transmitter is assumed to be stable, and because rapid variations in receiver frequency or phase can introduce distortions on the demodulated signals, the feedback loop that is employed for continued tracking in the steady-state mode generally has a long response time and/or a heavily dampened response. Although this dampened response is preferable once the receiver has properly acquired the transmitter, the dampened response has the effect of retaining an improperly acquired transmitter phase. Specifically, if the initially determined phase is incorrect, the dampened response will introduce a substantial delay before the proper phase is determined. While an incorrect phase is being used, the likelihood of demodulation errors is significantly higher than a demodulation at the correct phase.

BRIEF SUMMARY OF THE INVENTION

It is an object of this invention to improve the accuracy of initial frequency and phase acquisition in a CDMA system. It is a further object of this invention to improve the frequency and phase accuracy without substantially increasing the time required to acquire the frequency and phase of a transmission.

These objects and others are achieved by providing a system and method that searches for the frequency and phase of a CDMA transmission in an iterative manner. With its automatic frequency control (AFC) disabled, the receiving system performs a coarse search for the transmitter's CDMA phase at a nominal receiving frequency. When the coarse phase is obtained, the AFC is invoked with a large-range pull-in, to obtain an initial, coarse frequency that is likely to be closer to the transmitter's frequency than the initial nominal frequency. At this coarse frequency, the receiving system repeats its search for the transmitter's CDMA phase, starting at the previously determined coarse phase. Because this second phase determination is conducted in the presence of less frequency error, it provides for a more accurate phase determination. The AFC is again invoked, but with a small-range pull-in, to obtain a finer frequency determination. Because the finer frequency determination is conducted in the presence of less phase error, a substantial improvement in the accuracy and precision of the frequency determination can be achieved. To achieve this more accurate phase and frequency determination within the same time duration as a conventional acquisition process, the initial coarse phase determination is conducted using a rapid, albeit less accurate, process than the conventional phase determination.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
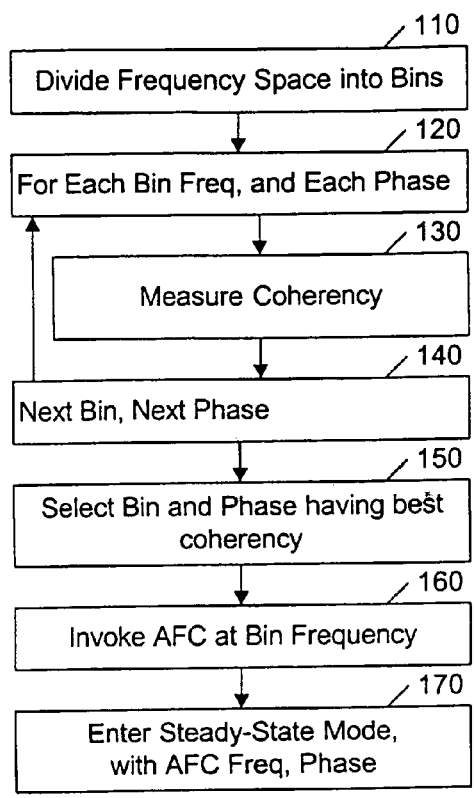
FIG. 1 illustrates an example flow diagram of a conventional CDMA frequency and phase acquisition system.

FIG. 1 illustrates an example flow diagram of a conventional CDMA frequency and phase acquisition system. As noted above, to detect a coherent signal, the receiver must be operated within a minimum range of the frequency as the transmitter, so that, for example, an initially in-phase demodulation does not go out-of-phase before the end of the code sequence. Generally, the variance of transmitters about a specified frequency is larger than this minimum range, and therefore the receiver is configured to search at a plurality of frequency 'bins', the size of each bin being less than or equal to this minimum range. The bins are defined at 110, and the search is conducted at a nominal frequency within each bin, via the loop 120–140.

At 130, the receiver measures the coherency of each code phase at each bin frequency, typically by initiating the code sequence at incrementally different phases. The code sequence has a given length, in bits, and the phase increment is typically half the duration of a single bit.

After all frequencies and all phases are tested, the bin and phase that provides the highest measure of consistency is selected, at 150. The receiver then invokes an automatic frequency control (AFC) to lock into the transmit frequency within the bin, at 160. The receiver then enters the steady-state mode for communicating with the transmitter, at 170. Within this steady-state mode, the receiver maintains tracking with the transmitter, based on the determined transmit frequency and code phase. As discussed above with regard to U.S. Pat. No. 6,134,260, this tracking is preferably maintained via a dampened/delayed feedback response.

Note that in the conventional acquisition process of FIG. 1, the code phase is determined at a nominal frequency within a bin, and not at the transmit frequency that is determined by the AFC. Because a frequency error produces a continuous phase shift, the determined coherency during the search process 130 does not accurately represent the coherency that would be achieved by the given phase at the actual transmit frequency. That is, a different phase and/or a different nominal frequency might have provided a higher coherency measure. Additionally, the resolution of the determined phase is limited to the tested phase increment.

Figure 2:
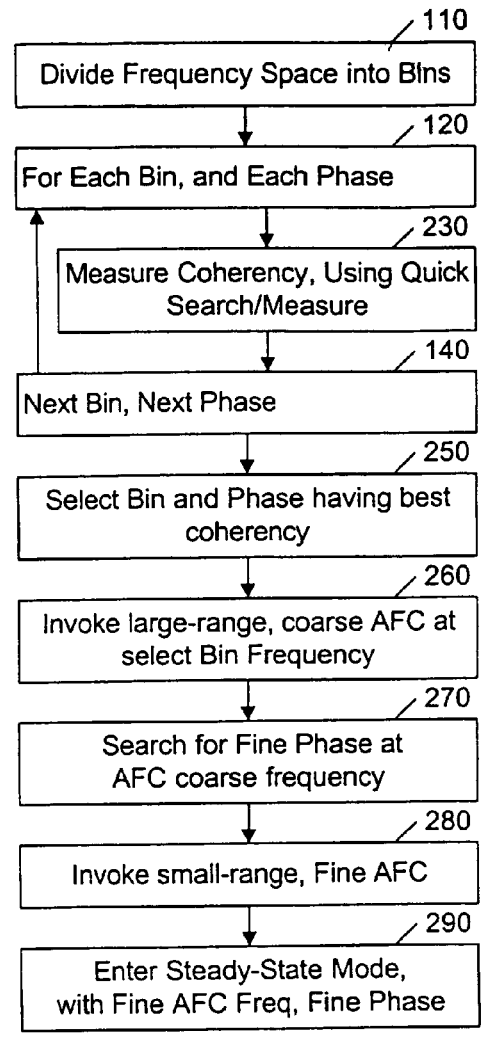
FIG. 2 illustrates an example flow diagram of an iterative CDMA frequency and phase acquisition system in accordance with this invention.

FIG. 2 illustrates an example flow diagram of an iterative CDMA frequency and phase acquisition system in accordance with this invention. In FIG. 2, the same reference numbers are used to identify similar processes as in FIG. 1. The expected variance of transmit frequencies is divided into bins, at 110, and each phase is tested at each bin frequency via the loop 120–140.

The coherency measurement process, at 230, is a 'quick' measurement at each phase increment. In a conventional system such as illustrated in FIG. 1, the coherency measurement process, at 130, is a thorough measurement process, because the determined phase based on this measurement process is used as the steady-state mode phase, at 170. That is, for example, the measure process at 130 is typically performed using a multi-dwell algorithm, wherein each measurement is based on multiple code-length samples, with filtering to reduce spurious measurement errors due to noise. Of particular note, the process 130 is designed to distinguish the true phase of the transmitter from nearby phases that show coherency due to reflected signals that are delayed relative to the true phase (multi-path effects), as well as to distinguish among signals sent from different transmitters. The coherency measurement process at 230, on the other hand, is specifically designed to provide a 'coarse' measure of coherency, to determine an approximate, or coarse, phase of the transmitter. As would be evident to one or ordinary skill in the art, a coarse measurement can be obtained by merely taking fewer samples than the conventional process. In a preferred embodiment, fewer than a dozen samples per phase are used to obtain the coherency measure at 230; depending upon the received noise, as few as one or two samples per phase may be used.

Note that because the processes 130 and 230 are employed for each bin frequency and each phase, a reduction in processing time at the block 230 provides for a substantial decrease in the time required to effect the look 120–140 in FIG. 2, compared to the prior art FIG. 1.

At 250, a coarse phase and select bin frequency is determined, corresponding to the highest coarse coherency measure. Alternatively, it can be expected that coarse coherency measures will exhibit a distribution of higher peak measurements near the transmitter frequency, and the coarse phase may be determined based on multiple measures, rather than a particular peak measure. In like manner, the select bin frequency may be a composite of bin frequencies that corresponds to these higher peak measurements.

At 260, the AFC is invoked to lock into the transmitter frequency near the select bin frequency. As compared to the AFC of 160 in FIG. 1, the AFC of 260 is preferably invoked with a large-range pull-in, so as to allow the receiver to potentially lock onto a transmit frequency that is beyond the extent of the select frequency bin.

At 270, the receiver again searches for the code phase, at the frequency that is determined by the large-range AFC of 260. This search is conducted by measuring the coherency at phases in the vicinity of the coarse phase that is determined at 250. Because the receiver will use the phase that is determined at this process step in the steady-state mode, at 290, a thorough process is used to measure the coherency at 270, comparable to the prior-art process 130 of FIG. 1. By employing a thorough process at 270 for each phase in the vicinity of the coarse phase, the effects of an erroneous determination of phase at 230 caused by a quick coherency determination are obviated.

Because the process at 270 is applied at a single frequency, and can be limited to phases within a narrow range of the coarse phase, additional time may be allowed for this process 270, compared to the process 130, which is applied at each bin and each phase increment. This additional time may be used to provide a more accurate coherency measure at each phase increment in the vicinity of the coarse phase. Alternatively, the phase increment can be reduced, thereby providing for a finer resolution in the determination of the transmitter phase. Even with the increased processing time at 270 for increased accuracy and/or resolution, it can be expected that the process of FIG. 2 will be at least as fast as, and likelier faster than, the process of FIG. 1, because the thorough coherency measurement process 270 is applied to substantially fewer frequency-phase combinations.

Note that, because the AFC frequency of 260 is likely to more accurately correspond to the transmitter frequency than the nominal bin frequency, the fine-phase determination of 270 occurs with less frequency error, and therefore less phase shift during the measurement process. As such, the fine-phase that is determined at 270 is more likely to correspond to the true transmitter phase than the phase that is determined in the prior art process of FIG. 1.

At 280, a small-range, fine AFC is invoked, starting at the AFC-determined coarse-frequency of 260. Because the AFC-determined coarse-frequency is likely to more accurately correspond to the transmitter frequency, the small pull-in range of the AFC of 280 can be smaller than the pull-in range of the AFC of 160 in FIG. 1, thereby allowing the AFC of 280 to lock onto the more finely determined transmitter frequency than the prior-art AFC of 160.

Figure 3:
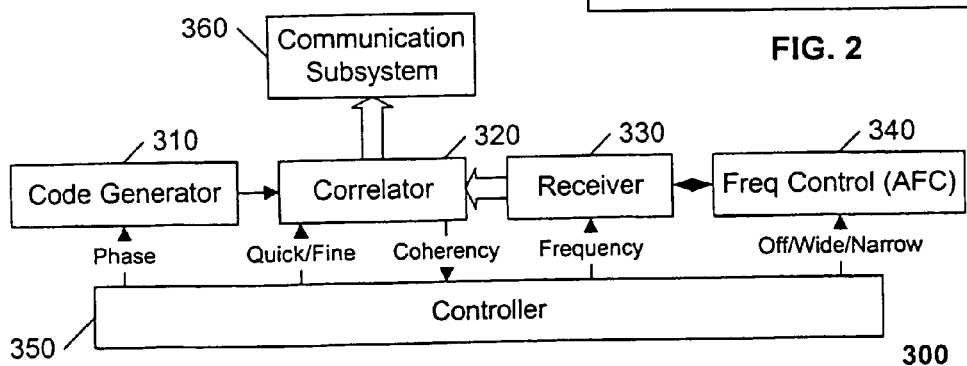
FIG. 3 illustrates an example block diagram of a CDMA frequency and phase acquisition system in accordance with this invention.

For completeness, FIG. 3 illustrates an example block diagram of a CDMA frequency and phase acquisition system 300 in accordance with this invention. As illustrated, the acquisition system 300 includes a receiver 330 that is configured to receive a frequency control signal from a controller 350, as well as frequency adjusting signals from an automatic frequency control (AFC) device 340.

The AFC device 340 is configured to receive a control signal from the controller 350 that determines whether the AFC is on or off, and if on, the pull-in range of the AFC (wide, corresponding to 260 of FIG. 2 or narrow, corresponding to 280).

A correlator 320 is configured to receive an input signal from the receiver 330, and to determine a coherency measure, based on a correlation of the input signal to a code sequence that is applied at a particular phase. In accordance with this invention, the correlator 320 is configured to effect either a quick or fine correlation determination, corresponding to 230 and 270 of FIG. 2. The code sequence is provided to the correlator 320 by a code generator 310, at a phase that is determined by the controller 350.

The controller 350 is configured to effect the functions illustrated in FIG. 2 by controlling the devices 310–340, based on coherency measures that are provided by the correlator 320. After the controller 350 acquires the fine frequency and phase, it enters the aforementioned steady-state tracking mode, and the correlator 320 provides the decoded signals to a communications subsystem 360 for ongoing communications with the acquired transmitter.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the particular partitioning of functions among blocks in the example system 300 is presented for illustrative purposes. One of ordinary skill in the art will recognize that two distinct correlators, a quick correlator and a fine correlator, could be used within the correlator 320 to provide the selectable correlation modes. In like manner, the correlator 320 and receiver 330 are likely to be integral to the communications subsystem 360. These and other system configuration and optimization features will be evident to one of ordinary skill in the art in view of this disclosure, and are included within the scope of the following claims.

I claim:

1. A communication system comprising:
   a receiver that is configured to receive a received signal corresponding to a transmitter of the received signal,
   an acquisition subsystem, operably coupled to the receiver, that is configured to acquire an acquisition frequency and an acquisition phase of the received signal, and
   a communication subsystem that is configured to effect communication with the transmitter, based on the acquisition frequency and acquisition phase,
   wherein
   the acquisition subsystem includes:
   a code generator that is configured to generate a code at a controlled phase;
   a correlator, operably coupled to the receiver and the code generator, that is configured to determine a measure of coherency of the received signal to the code, in at least one of two modes:
      a fine mode that provides the measure of coherency based on a plurality of measurements of correlation between the received signal and the code at the controlled phase,
      a quick mode that provides the measure of coherency based on fewer measurements of correlation than the plurality of measurements in the fine mode; and,
   a controller, operably coupled to the correlator, that is configured to control the correlator so as to:
      obtain a first plurality of coherency measures corresponding to a first plurality of controlled phases, while the correlator is in the quick mode,
      determine a coarse phase based on the first plurality of coherency measures,
      obtain a second plurality of coherency measures correspond to a second plurality of controlled phases, while the correlator is in the fine mode, and
      determine the acquisition phase based on the second plurality of coherency measures.

2. The communication system of claim 1, wherein
the second plurality of coherency measures is based on the coarse phase.

3. The communication system of claim 1, further including
   an automatic frequency controller, operably coupled to the receiver, that is configured to adjust a receiving frequency of the receiver based on the received signal, and
   wherein
   the controller is further configured to
      enable the automatic frequency controller before obtaining the second plurality of coherency measures, so that the second plurality of coherency measures are obtained at an AFC-controlled receiving frequency.

4. The communication system of claim 3, wherein
the automatic frequency controller is operable in one of at least two modes that include:
   a large-range mode that enables a lock-in to a frequency within a first range of an initial frequency, and a small-range mode that enables a lock-in to the frequency within a second range of the initial frequency, the second range being substantially smaller than the first range, and the controller is further configured to
enable the automatic frequency controller in the large-range mode before obtaining the second plurality of coherency measures, and
enable the automatic frequency controller in the small-range mode after obtaining the second plurality of coherency measures, so that the acquisition frequency corresponds to the frequency that is locked-in in the small-range mode.

5. The communication system of claim 1, wherein
the controller is further configured to control a receiving frequency of the receiver, and
the controller controls the receiving frequency via a selection of each of a plurality of bin frequencies corresponding to a range of possible transmitter frequencies.

6. The communication system of claim 1, wherein
the code corresponds to one of a plurality of orthogonal CDMA codes.

7. A CDMA acquisition system comprising:
a correlator that is configured to determine a measure of coherency of a received signal to an orthogonal CDMA code, in at least one of two modes:
  a fine mode that provides the measure of coherency based on a plurality of measurements of correlation between the received signal and the orthogonal CDMA code at a controlled phase,
  a quick mode that provides the measure of coherency based on fewer measurements of correlation than the plurality of measurements in the fine mode; and,
a controller, operably coupled to the correlator, that is configured to control the correlator so as to:
  obtain a first plurality of coherency measures corresponding to a first plurality of controlled phases, while the correlator is in the quick mode,
  determine a coarse phase based on the first plurality of coherency measures,
  obtain a second plurality of coherency measures correspond to a second plurality of controlled phases, while the correlator is in the fine mode, and
  determine an acquisition phase based on the second plurality of coherency measures.

8. The CDMA acquisition system of claim 7, wherein
the second plurality of controlled phases is based on the coarse phase.

9. The CDMA acquisition system of claim 7, wherein
the controller is further configured to control an automatic frequency controller of a receiver that provides the received signal, and
the controller enables the automatic frequency controller before obtaining the second plurality of coherency measures.

10. The CDMA acquisition system of claim 9, wherein
the automatic frequency controller is operable in one of at least two modes that include:
  a large-range mode that enables a lock-in to a frequency within a first range of an initial frequency, and
  a small-range mode that enables a lock-in to the frequency within a second range of the initial frequency, the second range being substantially smaller than the first range, and the controller is further configured to
enable the automatic frequency controller in the large-range mode before obtaining the second plurality of coherency measures, and
enable the automatic frequency controller in the small-range mode after obtaining the second plurality of coherency measures, so as to determine an acquisition frequency corresponding to the frequency that is locked-in in the small-range mode.

11. A method of acquiring characteristics corresponding to a transmitter of a received signal, the method comprising:
determining a first plurality of measures of coherency,
  each measure of coherency of the first plurality of measures of coherency being based on a first number of measurements corresponding to correlations between the received signal and each of a first plurality of controlled phases of a demodulation code,
determining a coarse phase, based on the first plurality of measures of coherency,
determining a second plurality of measures of coherency,
  each measure of coherency of the second plurality of measures of coherency being based a second number of measurements corresponding to correlations between the received signal and each of a second plurality of controlled phases of a demodulation code,
  the second number of measurements being larger than the first number of measurements, and
determining an acquisition phase, based on the second plurality of measures of coherency.

12. The method of claim 11, wherein
the second plurality of controlled phases is based on the coarse phase.

13. The method of claim 11, further including
enabling an automatic frequency control of a receiver frequency prior to determining the second plurality of measures of coherency.

14. The method of claim 11, further including:
enabling a large-range automatic frequency control of a receiver frequency prior to determining the second plurality of measures of coherency, and
enabling a small-range automatic frequency control of a receiver frequency after determining the second plurality of measures of coherency,
wherein
the large-range automatic frequency control allows for determining a coarse estimate of a transmit frequency of the transmitter within a first range about a first initial frequency, and
the small-range automatic frequency control allows for determining a fine estimate of the transmit frequency of the transmitter within a second range about a second initial frequency, and
the second range is smaller than the first range.

15. The method of claim 14, wherein
the second initial frequency corresponds to the coarse estimate of the transmit frequency.

* * * * *